United States Patent [19]

Liu

[11] Patent Number: 4,639,486

[45] Date of Patent: Jan. 27, 1987

[54] FLAME RETARDANT ELASTOMERIC COMPOSITIONS

[75] Inventor: Nan-I Liu, Mt. Vernon, Ind.

[73] Assignee: General Electric Company, Pittsfield, Mass.

[21] Appl. No.: 785,642

[22] Filed: Oct. 8, 1985

[51] Int. Cl.$^4$ .................................................. C08G 73/10
[52] U.S. Cl. ...................................... 524/409; 524/411; 524/412; 525/66; 525/180; 525/397; 525/423; 525/425; 525/433
[58] Field of Search ....................... 524/409, 411, 412; 525/66, 180, 397, 423, 425, 433

[56] References Cited

U.S. PATENT DOCUMENTS

| | | | |
|---|---|---|---|
| 4,107,231 | 8/1978 | Wurmb et al. | 524/412 |
| 4,111,892 | 9/1978 | Kamada et al. | 524/412 |
| 4,203,931 | 5/1980 | Lee | 525/4 |
| 4,205,142 | 5/1980 | Baer | 525/166 |
| 4,370,438 | 1/1983 | De Guia | 524/412 |
| 4,374,220 | 2/1983 | Sonnenberg | 524/94 |
| 4,454,302 | 6/1984 | Ohmura et al. | 525/167 |
| 4,456,719 | 6/1984 | Yamamoto et al. | 524/114 |
| 4,546,139 | 10/1985 | Bay et al. | 524/367 |
| 4,555,540 | 11/1985 | Avakian | 524/130 |
| 4,582,866 | 4/1986 | Shain | 524/94 |

*Primary Examiner*—Lucille M. Phynes
*Attorney, Agent, or Firm*—Edward K. Welch, II; William F. Mufatti; Richard J. Traverso

[57] ABSTRACT

Novel flame retardant elastomeric materials are prepared by admixing a polyetherimide ester and a halogenated flame retarding material. Optionally these compositions may further comprise a modifier resin selected from condensation polymers and addition polymers, flame retardant synergists and drip suppressant.

29 Claims, No Drawings

FLAME RETARDANT ELASTOMERIC COMPOSITIONS

The present invention relates to novel flame retardant thermoplastic elastomeric molding compositions. Specifically, the compositions of the present invention comprise polyetherimide esters having admixed therewith a halogenated flame retarding compound or polymer. Optionally, these flame retardant compositions may further comprise one or more high molecular weight polymeric or copolymeric resinous materials and/or filler material.

Polyetherester imides are well known having been described in numerous publications and patents including for example, Honore et al, "Synthesis and Study of Various Reactive Oligomers and of Poly(ester-imideether)s," *European Polymer Journal* Vol. 16, pp. 909–916, Oct. 12, 1979; and in Kluiber et al, U.S. Pat. No. 3,274,159 and Wolfe Jr., U.S. Pat. Nos. 4,371,692 and 4,371,693, respectively. More recently, McCready in pending U.S. patent application Ser. No. 665,277 filed Oct. 26, 1984, now U.S. Pat. No. 4,556,705 granted Dec. 3, 1985 disclosed a novel class of polyetherimide esters having superior elastomeric and other desired characteristics.

While the foregoing polymers having ether, imide and ester units have many desired properties including good flexibility, impact strength and moldability, these compositions are limited to certain applications due to their ease of flammability. Although it is well recognized that the presence of nitrogen in a polymer has some inhibiting effect on the flammability of a resin, the polymers of the present invention also have a high oxygen content which greatly enhances flammability and more than offsets any benefit that may be attributed to the nitrogen content.

Thus, it is an object of the present invention to provide elastomeric polyetherimide esters and polyetherester imides having reduced flammability.

It is also an object of the present invention to provide flame retardant polyetherimide esters and polyetherester imides having excellent physical properties.

SUMMARY

In accordance with the present invention, there are provide novel, flame retardant thermoplastic compositions having excellent physical properties and, most importantly, reduced flammability comprising (A)(i) one or more thermoplastic elastomeric polymers characterized as having ether, ester and imide linkages and wherein the ether linkages are present as high molecular weight, i.e. MW of from about 400 to about 12000, polyoxyalkylene or copolyoxyalkylene units derived from long chain ether glycols or long chain ether diamines, alone or in combination with (ii) one or more high molecular weight homopolymeric or copolymeric modifying resins and (B) a flame retarding amount of a halogenated flame retardant compound or polymer.

Generally, these compositions will comprise from about 0.5 to 50 parts by weight, preferably from about 5 to 40 parts by weight, most preferably from about 15 to 30 parts by weight, of flame retardant per 100 parts by weight resinous component A, wherein resinous component A is from about 30 to 100% by weight elastomer A(i) and from 0 to about 70% modifying resin A(ii). Preferred compositions will further comprise in effective amounts flame retardant synergists and drip suppressants. Optionally, these compositions may further comprise reinforcing fillers, non-fibrous fillers, stabilizers and the like.

DETAILED DESCRIPTION OF THE INVENTION

Thermoplastic elastomeric polymers (A)(i) suitable for use in the practice of the present invention are characterized as containing imide, ester and ether linkages wherein the ether linkages are present as high molecular weight, i.e. from about 400 to about 12000 MW, preferably from about 900 to about 4000, polyoxyalkylene or copolyoxyalkylene units derived from long chain ether glycols or long chain ether diamines. Typically these thermoplastic elastomeric polymers are referred to as poly(etherester imide)s, poly(esterimide ethers) and poly(etherimide ester)s.

The preferred class of thermoplastic elastomers (A)(i) suitable for use in the practice of the present invention are the polyetherimide esters as described in U.S. Pat. No. 4,544,734; McCready, Ser. No. 665,277 filed Oct. 26, 1984 and in McCready et al., Ser. No. 691,028, filed Jan. 11, 1985, altogether incorporated herein by reference. In general, these polyetherimide esters are random and/or block copolymers prepared by conventional processes from (i) one or more diols, (ii) one or more dicarboxylic acids and (iii) one or more polyoxyalkylene diimide diacids or the reactants therefor. Especially preferred poly(etherimide esters) are prepared from (i) one or more low molecular weight aliphatic, cycloaliphatic and/or aromatic diol, (ii) one or more low molecular aliphatic, cycloaliphatic and/or aromatic dicarboxylic acid or ester derivative thereof and (iii) one or more polyoxyalkylene diimide diacid wherein the weight ratio of the diimide diacid (iii) to dicarboxylic acid (ii) is from about 0.25 to 2.0, preferably from about 0.4 to 1.4.

Suitable low molecular weight diols (i) for use in the preparation of the polyetherimide ester include saturated and unsaturated aliphatic and cycloaliphatic dihydroxy compounds as well as aromatic dihydroxy compounds. These diols are preferably of a low molecular weight, i.e. having a molecular weight of about 300 or less. When used herein, the term "diols" and "low molecular weight diols" should be construed to include equivalent ester forming derivatives thereof, provided, however, that the molecular weight requirement pertains to the diol only and not to its derivatives. Exemplary of ester forming derivatives there may be given the acetates of the diols as well as, for example, ethylene oxide or ethylene carbonate for ethylene glycol.

Preferred saturated and unsaturated aliphatic and cycloaliphatic diols are those having from about 2 to 19 carbon atoms. Exemplary of these diols there may be given ethylene glycol; propanediol; butanediol; pentanediol; 2-methyl propanediol; 2,2-dimethyl propanediol; hexanediol; decanediol; 2-octyl undecanediol; 1,2-, 1,3- and 1,4- dihydroxy cyclohexane; 1,2-, 1,3- and 1,4- cyclohexane dimethanol; butenediol; hexene diol, etc. Especially preferred are 1,4-butanediol and mixtures thereof with hexanediol or butenediol, most preferably 1,4-butanediol.

Aromatic diols suitable for use in the preparation of the thermoplastic elastomers are generally those having from 6 to about 19 carbon atoms. Included among the aromatic dihydroxy compounds are resorcinol; hydroquinone; 1,5-dihydroxy naphthalene; 4,4'-dihydroxy diphenyl; bis(p-hydroxy phenyl)methane and 2,2-bis(p-hydroxy phenyl)propane.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed, it is preferred that at least about 60 mole %, based on the total diol content, be the same diol, most preferably at least 80 mole %. As mentioned above, the preferred thermoplastic elastomers are those in which 1,4- butanediol is present in a predominant amount, most preferably when 1,4-butanediol is the only diol.

Dicarboxylic acids (ii) which are suitable for use in the preparation of the poly(etherimide esters) are aliphatic, cycloaliphatic, and/or aromatic dicarboxylic acids. These acids are preferably of a low molecular weight, i.e., having a molecular weight of less than about 350; however, higher molecular weight dicarboxylic acids, especially dimer acids, may also be used. The term "dicarboxylic acids" as used herein, includes equivalents of dicarboxylic acids having two functional carboxyl groups which perform substantially like dicarboxylic acids in reaction with glycols and diols in forming polyester polymers. These equivalents include esters, such as the lower alkyl esters, and ester-forming derivatives, such as acid halides and anhydrides. The molecular weight preference, mentioned above, pertains to the acid and not to its equivalent ester or ester-forming derivative. Thus, an ester of a dicarboxylic acid having a molecular weight greater than 350 or an acid equivalent of a dicarboxylic acid having a molecular weight greater than 350 are included provided the acid has a molecular weight below about 350. Additionally, the dicarboxylic acids may contain any substituent group(s) or combinations which do not substantially interfere with the polymer formation and use of the polymer of this invention.

Aliphatic dicarboxylic acids, as the term is used herein, refers to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used are sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxylic acid, azelaic acid, diethylmalonic acid, allylmalonic acid, dimer acid, 4-cyclohexene-1,2- dicarboxylic acid, 2-ethylsuberic acid, tetramethylsuccinic acid, cyclopentane dicarboxylic acid, decahydro-1,5-naphthalene dicarboxylic acid, 4,4'-bicyclohexyl dicarboxylic acid, decahydro-2,6-naphthalene dicarboxylic acid, 4,4 methylenebis(cyclohexane carboxylic acid), 3,4-furan dicarboxylic acid, and 1,1-cyclobutane dicarboxylic acid. Preferred aliphatic acids are cyclohexane dicarboxylic acids, sebacic acid, dimer acid, glutaric acid, azelaic acid and adipic acid.

Representative aromatic dicarboxylic acids which can be used include terephthalic, phthalic and isophthalic acids; bi-benzoic acid; substituted dicarboxy compounds with two benzene nuclei such as bis(p-carboxyphenyl) methane, oxybis(benzoic acid), ethylene-1,2- bis-(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, and 4,4'-sulfonyl dibenzoic acid; and halo and $C_1$–$C_{12}$ alkyl, alkoxy, and aryl ring substitution derivatives thereof. Hydroxy acids such as p(beta-hydroxyethoxy)benzoic acid can also be used provided an aromatic dicarboxylic acid is also present.

Preferred dicarboxylic acids for the preparation of the polyetherimide esters are the aromatic dicarboxylic acids, mixtures thereof and mixtures of one or more dicarboxylic acid with an aliphatic and/or cycloaliphatic dicarboxylic acid, most preferably the aromatic dicarboxylic acids. Among the aromatic acids, those with 8-16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in the preparation of the poly(etherimide ester), it is preferred that at least about 60 mole %, preferably at least about 80 mole %, based on 100 mole % of dicarboxylic acid (ii) be of the same dicarboxylic acid or ester derivative thereof. As mentioned above, the preferred poly(etherimide esters) are those in which dimethylterephthalate is the predominant dicarboxylic acid, most preferably when dimethylterephthalate is the only dicarboxylic acid.

Polyoxyalkylene diimide diacids (iii) are high molecular weight diimide diacids wherein the average molecular weight is greater than about 700, most preferably greater than about 900. They may be prepared by the imidization reaction of one or more tricarboxylic acid compounds containing two vicinal carboxyl groups or an anhydride group and an additional carboxyl group, which must be esterifiable and preferably is nonimidizable, with a high molecular weight polyoxyalkylene diamine. These polyoxyalkylene diimide diacids and processes for their preparation are more fully disclosed in McCready, pending U.S. patent application Ser. No. 665,192 filed Oct. 26, 1984, incorporated herein by reference.

In general, the polyoxyalkylene diimide diacids are characterized by the following formula:

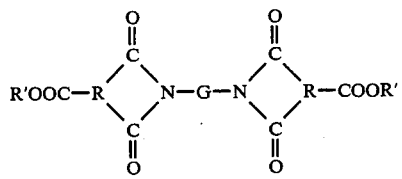

wherein each R is independently a trivalent organic radical, preferably a $C_2$ to $C_{20}$ aliphatic, aromatic or cycloaliphatic trivalent organic radical; each R' is independently hydrogen or a monovalent organic radical preferably selected from the group consisting of $C_1$ to $C_6$ aliphatic and cycloaliphatic radicals and $C_6$ to $C_{12}$ aromatic radicals, e.g. benzyl, most preferably hydrogen; and G is the radical remaining after removal of the terminal, or as nearly terminal as possible, amino groups of a poly(oxyalkylene) diamine or copoly(oxyalkylene) diamine of from about 400 to 12000 molecular weight.

Preferred poly(oxyalkylene) units are derived from long chain alkylene ether diamines of from about 900 to about 4000 molecular weight having a carbon-to-oxygen ratio of from about 1.8 to about 4.3, exclusive of any side chains. Such diamines may be derived from the amination of poly(oxyalkylene) glycols as mentioned in U.S. application Ser. No. 665,192, filed Oct. 26, 1985 herein incorporated by reference. Other processes for the preparation of said diamines will be known by those skilled in the art.

Representative of suitable poly(oxyalkylene) diamines there may be given poly(ethylene ether) diamine; poly(propylene ether) diamine; poly(tetramethylene ether) diamine; the amination product of random or block copolymers of ethylene oxide and propylene oxide, including ethylene oxide end capped poly(propylene ether)glycol and predominately poly(ethylene ether) backbone, copoly(propylene ether-ethylene ether)glycol and the amination product of random or block copolymers of tetrahydrofuran with minor amounts of a second monomer such as ethylene oxide, propylene oxide, or methyltetrahydrofuran (used in proportions such that the carbon-to-oxygen ratio does not exceed about 4.3). Other diamines contemplated within the scope of the present invention include the amination product of polyformal glycols prepared by reacting formaldehyde with diols such as 1,4-butanediol and 1,5-pentanediol. Especially preferred poly(oxyalkylene)diamines are poly(propylene ether)diamine, poly(tetramethylene ether)diamine and predominately poly(ethylene ether) backbone copoly(propylene etherethylene ether)diamine.

The tricarboxylic component may be most any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable and preferably is substantially non-imidizable.

Further, while trimellitic anhydride is preferred as the tricarboxylic component, any of a number of suitable tricarboxylic acid constituents will occur to those skilled in the art including: 2,6,7 naphthalene tricarboxylic anhydride; 3,3',4 diphenyl tricarboxylic anhydride; 3,3',4 benzophenone tricarboxylic anhydride; 1,3,4 cyclopentane tricarboxylic anhydride; 2,2',3 diphenyl tricarboxylic anhydride; diphenyl sulfone - 3,3',4 tricarboxylic anhydride, ethylene tricarboxylic anhydride; 1,2,5 naphthalene tricarboxylic anhydride; 1,2,4 butane tricarboxylic anhydride; diphenyl isopropylidene 3,3',4 tricarboxylic anhydride; 3,4 dicarboxyphenyl 3'-carboxylphenyl ether anhydride; 1,3,4 cyclohexane tricarboxylic anhydride; etc. These tricarboxylic acid materials can be characterized by the following formula:

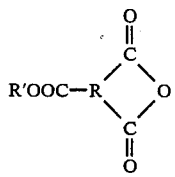

where R is a trivalent organic radical, preferably a $C_2$ to $C_{20}$ aliphatic, aromatic, or cycloaliphatic trivalent organic radical and R' is preferably hydrogen or a monovalent organic radical preferably selected from the group consisting of $C_1$ to $C_6$ aliphatic and/or cycloaliphatic radicals and $C_6$ to $C_{12}$ aromatic radicals, e.g. benzy; most preferably hydrogen.

In the preparation of the poly(etherimide ester)s, the diimide diacid may be preformed in a separate step prior to polymerization, as described above, or they may be formed during polymerization itself. In the latter instance, the polyoxyalkylene diamine and tricarboxylic acid component may be directly added to the reactor together with the diol and dicarboxylic acid, whereupon imidization occurs concurrently with esterification. Alternatively, the polyoxyalkylene diimide diacids may be preformed prior to polymerization by known imidization reactions including melt synthesis or by synthesizing in a solvent system. Such reactions will generally occur at temperatures of from 100° C. to 300° C., preferably at from about 150° C. to about 250° C. while drawing off water or in a solvent system at the reflux temperature of the solvent or azeotropic (solvent) mixture.

Preferred polyetherimide esters are those in which the weight ratio of the polyoxyalkylene diimide diacid (iii) to dicarboxylic acid (ii) is from about 0.25 to about 2, preferably from about 0.4 to about 1.4.

Especially preferred polyetherimide esters comprise the reaction product of dimethylterephthalate, optionally with up to 40 mole % of another dicarboxylic acid; 1,4-butanediol, optionally with up to 40 mole % of another saturated or unsaturated aliphatic and/or cycloaliphatic diol; and a polyoxyalkylene diimide diacid prepared from a polyoxyalkylene diamine of molecular weight of from about 400 to about 12000, preferably from about 900 to about 4000, and trimellitic anhydride. In its most preferred embodiments, the diol will be 100 mole % 1,4-butanediol and the dicarboxylic acid 100 mole % dimethylterephthalate.

As mentioned, the polyetherimide esters may be prepared by conventional esterification/condensation reactions for the production of polyesters. Exemplary of the processes that may be practiced are as set forth in, for example, U.S. Pat. Nos. 3,023,192; 3,763,109; 3,651,014; 3,663,653 and 3,801,547, herein incorporated by reference.

Finally, it is contemplated that the present invention is also applicable to other imide containing thermoplastic elastomers including the polyetherester imides and polyesterimide ethers. Such polymers and their manufacture are described in for example, Honore et al "Synthesis and Study of Various Reactive Oligomers and of Poly(esterimide ethers)" *European Polymer Journal,* Vol. 16 pp. 909–916, Oct. 12, 1979 and in Wolfe Jr., U.S. Pat. Nos. 4,371,692 and 4,371,693, herein incorporated by reference.

In the practice of the present invention, the thermoplastic elastomer A(i) may be used alone or in combination with one or more high molecular weight thermoplastic modifier resin A(ii). Generally, two classes of modifier resin may be employed; these are the condensation polymers and the addition polymers.

Suitable condensation polymers include for example polyesters, polycarbonates, polyestercarbonates, polyphenylene ethers, polyetherimides, polyamides and copolyetheresters. Each of these are well known in the art and are briefly described in U.S. Pat. No. 4,510,289, incorporated herein by reference.

The preferred condensation polymers are the polyesters including homopolyesters, copolyesters and any combination thereof. Preferred polyesters will be of the general formula:

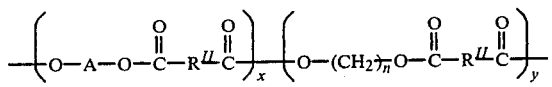

Where A is the radical remaining after removal of the terminal hydroxy group of A cis or trans isomer (or mixtures thereof) of a cyclo-aliphatic diol, most preferably 1,4 cyclohexanedimethanol; R is the divalent radical remaining after removal of the carboxylic groups of an aromatic dicarboxylic acid, preferably terephthalic acid, isophthlic acid and mixtures thereof; n is a whole number of from 2–8, preferably 2–4 and each of x and y represent 0 to 100 weight percent of the polyester provided the total of (x+y) equals 100 weight percent.

Exemplary of polyesters within the scope of the present invention include, polyethylene terephthalate, polybutylene terephthalate, and polyesters derived from cyclohexane dimethanol or a mixture thereof with ethylene glycol and terephthalic and/or isophthalic acids, or the lower ($C_1$–$C_4$) alkyl esters thereof.

Addition polymers suitable for use in the practice of the present invention encompass a broad genus of polymer resins. Typically, the addition polymers are derived from one or more monomers selected from the group consisting essentially of vinyl aromatic compounds, esters of acrylic and alkyl acrylic acids, conjugated dienes and mixtures thereof. Obviously, other monomers may also be used provided one or more of the foregoing monomers are present in a predominant amount. Exemplary of suitable addition polymers are those as described in U.S. Pat. No. 4,511,693 and pending U.S. patent application Ser. No. 702,546 filed Feb. 19, 1985, both incorporated herein by reference. Specific addition polymers include ABS graft copolymers, EPDM and EPR rubbers, polymethyl methacrylate, styrene-butadiene block copolymers styrene-butadiene-styrene and styrene-hydrogenated butadiene-styrene triblock copolymers, and predominately butadiene or butylacrylate core, core-shell copolymers and the like.

Where the modifying resin A(ii) is employed together with the thermoplastic elastomer A(i) it will generally be present in an amount up to about 70% by weight, preferably from about 5 up to about 50% by weight, based on the combined weight of thermoplastic elastomer A(i) and modifier resin A(ii). Within these ranges, it is also possible to employ combinations of modifier resin as for example two or more condensation polymers, two or more addition polymers and mixtures of the two. Exemplary of such blends would be a combination of polyethylene terephthalate and polybutylene terephthalate or a combination of polybutylene terephthalate and a butadiene based core, core-shell copolymer.

Suitable flame retardants for use in the practice of the present invention encompass a broad genus of halogenated organic flame retardant additvtes. While each species and individual species member may have varying efficacy with respect to its flame retarding abilities, generally all are believed to lend some degree of flame retardancy. Applicants have also found that while combinations of flame retardants often result in improved flame retardancy, the use of certain reactive or reactable halogenated compounds, such as hydroxy containing flame retardant compounds and/or high molecular weight polymers, with flame retardant compounds commonly associated with the undesired manifestation of blooming, results in the supression and, in some instances, elimination of blooming.

Generally, the flame retardant additives within the scope of the present invention include compounds, oligomers, and polymers represented by the formula:

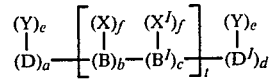

wherein a, b, c, d, and t are all whole numbers including zero provided that at least one of a, b, and d must be greater than zero when c is not zero. Obviously, when both b and c are zero, t is zero; otherwise, t may be 1 to 100 or even higher depending upon the molecular weight of the flame retardant polymer. Additionally, the letters e and f are each zero or a whole number up to the maximum number of replacable hydrogen atoms on D and $D^I$ and B and $B^I$ respectively, provided that at least one of e or f are greater than zero.

D and $D^I$ are mono- and poly-carbocyclic aromatic groups such as phenylene, biphenylene, terphenylene, naphthylene, phthalanhydride, phthalimide, and the like. Alternatively, where t is one or greater, D and $D^I$, in addition to the foregoing, may represent the end group or chain stopper to an oligomeric or polymeric chain derived from B repeating units, alone or together with $B^I$ repeating units. Such end groups are dependent upon the repeating units and/or reactants or monomers therefor in the polymeric chain and will be well-known and readily recognized by those skilled in the art. Similarly, chain stoppers for the various polymeric flame retardants will be well-known to those skilled in the art. In general, such chain stoppers are mono-functional and react with the end groups of the repeating units: once again their particular selection is dependent upon the mer units and/or reactants employed in manufacturing the polymer flame retardant. In any case, D and $D^I$ may be the same or different.

B and $B^I$ are divalent hydrocarbon radicals such as alkylene, alkylidine, cycloaliphatic or arylene radicals including, for example, methylene, ethylene, ethylidene, propylene, isopropylene, isopropylidene, butylene, isobutylene, amylene, cyclohexylene, cyclopentylidene, phenylene, diphenylene, and the like; a linkage selected from the group consisting of ether, carbonyl, and carbonate; a sulfur-containing linkage (e.g. sulfide, sulfoxide, sulfone); a phosphorous-containing linkage; and the like. B and $B^I$ may also consist of two or more of the foregoing hydrocarbon radicals connected by such groups as aromatic radicals, ether, ester, carbonyl, sulfide, sulfoxide, sulfone, phosphorus-containing linkages, and the like. Furthermore, B and $B^I$ may also be a dihydric phenol (e.g., bisphenol-A) carbonate linkage or bisphenol-A epoxy units derived from the reaction of, for example, bisphenol-A (or halogen substituted bisphenol A) and epichlorohydrin.

Each Y substituent is independently selected from the group consisting of organic, inorganic or organo metallic radicals. The substituents represented by Y include (1) halogen, e.g. chlorine, bromine, flourine, or iodine; (2) hydroxyl; (3) ether groups of the general formula OE wherein E is a monovalent hydrocarbon radical similar to $X^I$; (4) monovalent hydrocarbon groups of the type represented by $X^I$; (5) other substituents including e.g., nitro, cyano, etc. with such other substituents being essentially inert provided there be at least one and preferably at least two halogen atoms per aryl (e.g., phenyl) nucleus.

X is a substituent selected from halogen, e.g. chlorine, bromine, flourine, iodine; monovalent hydrocarbon groups exemplified by the following: alkyl, such as methyl, ethyl, propyl, isopropyl, butyl, decyl and the like; aryl groups such as phenyl, naphthyl, biphenyl, xylyl, tolyl, and the like; aralkyl groups such as benzyl, ethyl phenyl, and the like; cycloaliphatic groups, such as cyclopentyl, cyclohexyl, and the like; as well as monovalent hydrocarbon groups containing inert substituents therein. It will be understood that where more than one X is employed, they may be alike or different. Furthermore, where Y is not present, at least one of X must be or contain as a substituent one or more halogen atoms.

$X^I$ is the same as X above except that $X^I$ may not be or contain halogen.

Halogenated aromatic compounds within the scope present invention include, for example, tetrabromobenzene, tetrachlorobenzene, pentabromotoluene, hexachlorobenzene, hexabromobenzene, hexabromobiphenyl, octabromobiphenyl, 2,2'-dichlorbiphenyl, 2,4'-dibromobiphenyl, 2,4'-dichlorobiphenyl, hexabromobiphenyl, triphenylchloride, tetrachlorophthalic acid, tetrachloroanhydride, tetrabromophthalic acid, tetrabromophthalic anhydride, tribromophenol, tetrabromophenol, as well as additional halogenated aromatic compounds known in the art.

Also included within the scope of the invention are diaromatics of which the following are representative: 2,2-bis(3,5-dichlorophenyl) propane; bis(2-chlorophenyl) methane; bis(2,6-dibromophenyl) methane; 1,1-bis(4-iotophenyl) ethane; 1,2-bis(2,6-dichlorophenyl) ethane; 1,1-bis(2-chloro-4-iotophenyl) ethane; 1,1-bis(2-chorlo-4-methylphenyl) ethane; 1,1-bis(3,5-dichlorophenyl) ethane; 2,2-bis(3-phenyl-4-bromophenyl) ethane; 2,3-bis(4,6-dichloronaphthyl) propane; 2,2-bis(2,6-dichlorophenyl) pentane; 2,2-bis(3,5-dichlorophenyl) hexane; bis(4-chlorophenyl) methane; bis(3,5-dichlorophenyl) cyclohexylmethane; bis(3-nitro-4-bromophenyl) methane; bis(4-hydroxy-2,6-dichloro-3-methyoxyphenyl) methane; 2,2-bis(3,5-dichloro-4--hydroxyphenyl) propane; bis(3,5-dibromo-4-hydroxyphenyl) propane; 2,2-bis(3-bromo-4-hydroxyphenyl) propane; 2,2-bis(3,5-dibromo-4-hydroxylphenyl) propane diglycidyl ether; bis(4-(2,3-dibromopropoxy)-3,5-dichlorophenyl) methane, or the like.

The preparation of these and other applicable biphenyls are known in the art. In place of the divalent aliphatic group, in the above examples, there may be substituted sulfide, sulfoxy, and the like. For example there may be given, 2,4-dichloro-2',4'-dibromophenylsulfoxide, bis(2,4-dichlorophenyl) sulfide or the like.

Additional compounds within the scope of the invention are the halogenated diphenyl ethers. Especially preferred are those those containing two to ten halogen atoms, such as decabromodiphenyl ether, octabromodiphenyl ether, hexabromodiphenyl ether, pentabromodiphenyl ether, tetrabromodiphenyl ether, tribromodiphenyl ether, dibromodiphenyl ether, hexachlorodiphenyl ether, pentachlorodiphenyl ether, tetrachlorodiphenyl ether, trichlorodiphenyl ether, dichlorodiphenyl ether and halogenated diphenyl polyalkylene ethers of the formula

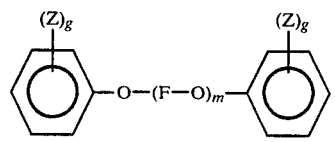

II wherein g is a whole number of 1–5, preferably 5; m is a whole number of 1–10, preferably 1–3; Z is a halogen, e.g. bromine or chlorine; and F is a divalent hydrocarbon radical of 1–6, preferably 1–4 carbon atoms including methylene, ethylene, propylene, isopropylene, butylene, and the like. Preferred diphenyl ethers, are for example those containing 6–10 halogens including for instance bis(2,4,6-tribromophenyl) ether and decabromobiphenyl ether.

Also included within the scope of the present invention are halogenated phthalimides and halogenated bisphthalimides of the general formula

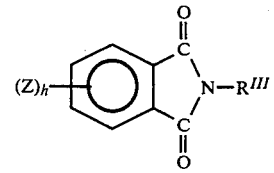

III or

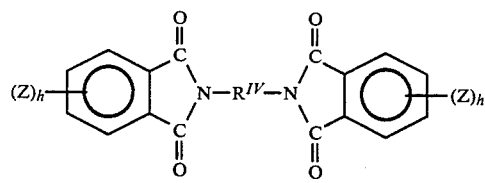

IV or mixtures thereof wherein $R^{III}$ is A hydrogen atom or a $C_1$–$C_6$, preferably $C_1$–$C_4$, alkyl or halogenated alkyl radical or a non-substituted or halogen substituted phenyl or naphthyl radical. $R^{IV}$ is a single bond or a divalent radical of the type represented by B above, Z is a halogen atom, preferably, bromine or chlorine, and h is a whole number from 1–4 and is preferably 4. Exemplary of suitable halogenated phthalimides according to formula III are: dichlorophthalimide, dibromophthalimide, tetrabromophthalimide, tribromophthalimide, tetrachlorophthalimide, trichlorophthalimide, n-methyl-tetrachlorophthalimide, N-ethyltetrachlorophthalimide, N-propyltetrachlorophthalimide, N-isobutyl-tetrachlorphthalimide, N-phenyl-tetrachlorophthalimide, N-(4-chloro-phenyl)-tetrachlorophthalimide, N-naphthyltetrachlorophthalimide, N-methyltetrabromophthalimide, N-ethyltetrabromophthalimide, N-butyltetrabromophthalimide, N-phenyl-tetrabomophthalimide, N-ethyltribromopthalimide, N-butyltribromophthalimide, and the like.

Exemplarly of suitable halogenated bisphthalimides according to formula IV include for example, bis-tetrabromophthalimide, bis-tetachlorophthalimide, bis-dibromodichlorophthalimide, bis-dibromophthalimide, and bis-tolubromophthalimide, N,N'-ethylene-di-tetrachlorophthalimide, N,N'-propylene-di-tetrachlorophthalimide, N,N'-butylene-di-tetrachlorophthalimide, N,N'-p-phenylene-di-tetrachlorophthalimide, 4,4'-ditetraphthalimido-diphenyl, N-(tetrachlorophthalimido)-tetrachlorophthalimide, N,N'-ethylene-ditetrabromophthalimide, N,N'-propylene-di-tetra-bromophthalimide, N,N'-butylene-di-tetrabromoph-thalimide, N,N'-p-phenylene-ditetrabromophthalimide, N,N'-ditetrabromophthalimido-diphenyl, N-(tetra-bromophthalimido)-tetrabromophthalimide, N,N'-pro-pylene-di-trichlorophthalimide, N,N'-propylene-di-tri-bromophthalimide, N,N'-p-phenylene-di-tribromoph-thalimide, and N,N'-di-tribromophthalimido-diphenyl. Mixtures of different halogenophthalimides of the formulas III and IV can also be used.

Also included within the scope of the present invention are the non-exuding, high and low molecular weight halogenated polymeric and copolymeric flame retardants. Inclusive of this group of flame retardants are the halogenated polystyrenes, especially the aromatically bound di- and tri-bromopolystyrenes; the halogenated polyphenylene oxides, especially the polydibromophenylene oxides; and the halogenated polyacrylates, especially those derived from the acrylic and methacrylic acids and esters thereof, particularly the benzylesters thereof, having aromatically bound halogen, e.g. bromine. Exemplary of suitable polyacrylate flame retardants are poly(pentabromobenzyl acrylate), poly(1,2,4,5-tetrabromoxylylene diacrylate) and tetrabromo-p-xylylene diacrylate-tetrachloro-p-xylylene diacrylate copolymer, especially preferred is polypentabromobenzyl acrylate.

Other suitable polymeric flame retardants are those derived from, at least in part, halogenated dihydric phenols. These include high and low molecular weight polycarbonates and copolycarbonates as well as the diglycidyl ethers of dihydric phenols. The former may be prepared by reacting the dihydric phenol with a carbonate precursor, e.g. carbonyl bromide or carbonyl chloride and, optionally, other dihydric phenols, glycols and/or dicarboxylic acids. The latter may be prepared by the reaction of dihydric phenol with a glycidyl or a glycidyl generating monomer such as epichlorohydrin. Suitable examples of the halogenated divalent phenols that may be employed in the preparation of the carbonate and the epoxy resins include 2,2-bis(3,5-dibromo-4-hydroxyphenyl) propane, 2,2-bis(3,5-dichloro-4-hydroxyphenyl) propane, bis(3,5-dibromo-4-hydroxyphenyl) methane, bis(3,5-dichloro-4-hydroxyphenyl) methane, 2,2-bis(4-hydroxy-2,3,5,6-tetrabromophenyl) propane, 2,2-bis(4-hydroxy-2,3,5,6-tetrachlorophenyl) propane, or the like. The most preferred halogenated dihydric phenol is 2,2-bis(3,5-dibromo-4-hydroxyphenyl) propane, wherein said carbonate polymer or copolymer and epoxy resin will have repeating units of formula V and VI, respectively.

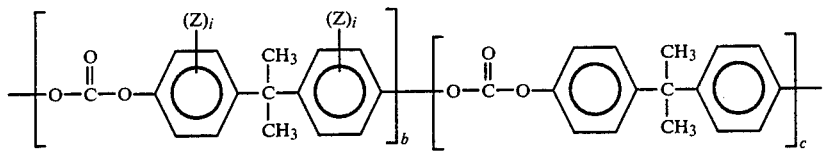

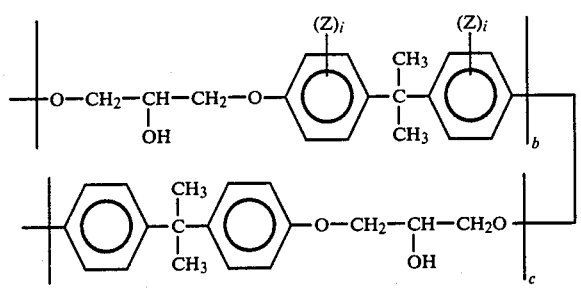

wherein b, c, and Z as defined above and i is a whole number from 1–4, preferably 2.

Preferred carbonate polymer flame retardants are (1) those having from 25 to 75, preferably 30 to 45, weight percent of the repeating units comprising the chloro- or bromo-substituted dihydric phenol units and the remainder comprising dihydric phenol, glycol or dicarboxyic acid units and (2) low molecular weight tetrabromobisphenol A polycarbonates of 2 to 10, preferably 4 to 7 repeating units and end capped with tribromophenol.

Obviously, these polymeric flame retardants have as terminal groups, reactive monomers from which they are derived, e.g. the dihydric phenol, carbonyl halide or a glycidyl group, or, particularly in the case of the low molecular weight polymers, they may be terminated by the use of chain stoppers which are monofunctional and reactive with the end groups of the repeating units. Suitable chain stoppers will be known to those skilled in the art and include, generally, monohydroxy compounds, e.g., methanol, ethanol, phenol, etc.; monocarboxylic acids or acid halides, among others. Particularly suitable are halogenated, e.g., bromine or chlorine, chain stoppers as for example the $Br_1$ to $Br_5$ or $Cl_1$ or to $Cl_5$ substituted phenols, especially tribromophenol.

The molecular weight of the polymeric flame retardants may vary widely and are generally from 2000 to 40,000. Preferred high molecular weight flame retardant polymer will have 20,000 to 40,000 molecular weight. Also halogen content may vary widely. The preferred halogen content is from about 20% to greater than 80%, preferably from about 35 to about 70%.

The foregoing flame retardant compounds and polymers are widely available commercially and are disclosed in numerous patent publications including for example U.S. Pat. Nos. 3,824,209; 3,833,685; 3,975,354; 3,957,905; 3,751,400; 3,992,480; 3,983,185; 4,035,447; 4,143,221; 4,148,841; 4,151,223; 4,152,368; 4,010,219; 4,221,888; 4,221,893; 4,208,489; 4,366,279; 4,373,047; and 4,521,557 as well as in European Patent Application No. 100,582 and Japanese Kokai Nos. 75-64337 and 75-119041. All the foregoing are herein incorporated by reference.

Because many of the low molecular weight flame retardant compounds have a tendency to migrate to the surface of the molded parts, it is preferred to use the oligomeric and high molecular weight flame retardant polymers and copolymers. However, surprisingly it has been found that when low molecular weight brominated compounds are used in conjunction with oligomeric or high molecular weight flame retardant compounds, particularly those with reactive, e.g. hydroxy end groups, the blooming or migrating problem is greatly reduced or eliminated. This is especially true of reactive halogenated compounds such as the brominated anhydrides and brominated aromatic acids. In general, though, any combination of flame retardants may be used in order to provide reduced flammability to the copolyetherimide ester compositions of the present invention.

Those skilled in the art are well aware that the amount by which the flame retardant additive will be used will vary with the nature of the resin and the efficiency of the additive. In general, however, the amount of additive will be from 0.5 to 50 parts by weight, preferably from 5 to 40 parts, most preferably from 15 to 30 parts, of the flame retardant per 100 parts of the thermoplastic resin (A).

The manner of adding the flame additives to the thermoplastic compositions of the present invention is not critical; suitable methods are conventional and would obvious to those skilled in the art.

In addition to the flame retardant compositions used herein, one may also use, and it is preferred to use, a flame retardant synergist, particularly the inorganic or organic antimony compounds. Such compounds are widely available or can be made in known ways. In preferred embodiments, the type of antimony compound used is not critical, the choice being primarily based on economics. For example, as inorganic compounds there can be used antimony oxide, antimony trioxide, antimony phosphate, $KSb(OH)_6$, $NH_4SbF_3$, and the like. A wide variety of organic antimony compounds can also be used such as antimony esters with organic acids, cyclic alkyl antimonates, aryl antimonic acids and the like. Illustrative of organic antimony compounds, including inorganic salts of such compounds are: KSb tartrate; Sb caproate; $Sb(OCH_2CH_3)_3$; $Sb(OCH(CH_3)CH_2CH_3)_3$; Sodium Antimonate; Sb polymethylene glycolate; polyphenylene antimony; and the like. Especially preferred are antimony oxide, antimony trioxide and sodium antimonate. These flame retardant synergists will be used in an amount of from about 1 to about 15 parts, preferably from about 2 to 10 parts by weight per 100 parts of resinous components (A). Furthermore, it is possible to substitute other synergistic agents in total or, preferably, in part for the antimony compound, e.g. Zinc borate.

Finally, in addition to the synergists referred to above, the flame retardant materials may also contain an effective amount of a non-dripping agent. This amount will generally be from about 0.01 to about 5 parts by weight, preferably from about 0.05 to about 2.0 parts by weight, based on 100 parts of resinous component (A). Suitable non-dripping agents are well-known and widely available. They include the fumed and colloidal silicas and polytetrafluoroethylene resins. Especially preferred are the polytetrafluoroethylene resins, most preferably TEFLON ® 6 from E. I. DuPont.

While the compositions of this invention possess many desirable properties, it is sometimes advisable and preferred to further stabilize certain of the compositions against thermal or oxidative degradation as well as degradation due to ultraviolet light. This can be done by incorporating stabilizers into the blend compositions. Satisfactory stabilizers comprise phenols and their derivatives, amines and their derivatives, compounds containing both hydroxyl and amine groups, hydroxyazines, oximes, polymeric phenolic esters and salts of multivalent metals in which the metal is in its lower state.

Representative phenol derivatives useful as stabilizers include 3,5-di-tert-butyl-4-hydroxy hydrocinnamic triester with 1,3,5-tris-(2-hydroxyethyl-s-triazine-2,4,6-(1H, 3H, 5H) trione; 4,4'-bis(2,6-ditertiary-butylphenyl); 1,3,5-trimethyl-2,4,6-tris-(3,5-ditertiary-butyl-4-hydroxylbenzyl)benzene and 4,4'-butylidene-bis(6-tertiary-butyl-m-cresol). Various inorganic metal salts or hydroxides can be used as well as organic complexes such as nickel dibutyl dithiocarbamate, manganous salicylate and copper 3-phenyl-salicylate. Typically amine stabilizers include N,N'-bis(beta-naphthyl)-p-phenylenediamine; N,N'-bis(1-methylheptyl)-p-phenylenediamine and either phenyl-beta-napththyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones and/or benzotriazoles.

Finally, while those compositions find special utility as elastomeric materials, one may further add various fillers and reinforcing agents to provide more stiffness to the material and/or to enhance its ability to withstand impact and return to its original shape. Specifically there may be added to the composition glass fiber, glass spheres, mica, clay, $TiO_2$, carbon fiber, carbon powder and the like. All of these additives are well known fillers and widely available commercially. Especially preferred as a filler material is clay because of its ability to provide the composition with good heat sag resistance, warp resistance and/or dynatup properties. Such fillers will generally be used in amounts up to about 50% by weight of the composition, preferably for about 5 to about 25% by weight, where present.

The compositions of the present invention are especially suitable for manufacturing molded parts requiring good flame resistance combined with excellent physical characteristics such as high strength and stress tolerance combined with good flexibility. Additionally, these materials may be used in extrusion coating processes as for example, wire and cable coverings.

DETAILED DESCRIPTION OF THE PREFERRED EMBODIMENTS

The following examples are presented as illustrative of the present invention and are not to be construed as limiting thereof.

The flame retardants used in demonstrating the present invention were as follows:

Table 1

FR-1: Concentrate comprising 58% by weight decabromodiphenyl ether, 29% by weight antimony oxide ($Sb_2O_3$) and 13% by weight ethylene vinyl acetate.

FR-2: N,N' ethylene bis(tetrabromophthalimide) commercially available as BT-93 from Saytex/Ethyl Corporation.

FR-3: Tribromophenol end capped poly(tetrabromobisphenol A) carbonate commercially available as BC 58 from Great Lakes Chemical Corporation.

FR-4: Poly(dibromophenylene ether) commercially availalbe as Firemaster TSA from Great Lakes Chemical Corporation.

FR-5: High molecular weight Bisphenol A/tetrabromobisphenol A copolycarbonate commercially available as LEXAN® RL 1624 from General Electric Company.

FR-6: Poly(pentabromo benzyl acrylate)(Chem. Abs. 59447-57-3) of formula:

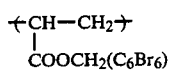

commercially availalbe as FR 1025 from Ameribrom Company.

FR-7: Poly(tetrabromo bisphenol A glycidyl ether) resin (MW 20,000-40,000) commercially available as Thermoguard 240 from M&T Chemicals, Inc.

FR-8: Concentrate comprising 75% by weight FR-7 and 25% by weight $Sb_2O_3$ commercially available as Thermoguard 243 from M&T Chemicals, Inc.

FR-9: Tetrabromophthalic anhydride commercially available as RB-49 from Saytex/Ethyl Corporation.

TEFLON Conc.: Concentrate of 20% by weight. TEFLON 6 commercially available from E. I. duPont and 80% by weight LEXAN® polycarbonate resin commercially available from General Electric Company.

$Sb_2O_3$ Conc: Concentrate of 80% by weight antimony oxide and 20% by weight polyethylene.

Unless otherwise stated, all compositions were prepared by dry blending the ingredients followed by extrusion through a single screw extruder at 460° F. Test specimens were prepared by injection molding in accordance with proper specifications for ASTM and UL determinations.

The following ASTM methods were used in determining the physical characteristics of the compositions:
Flexural Modulus: ASTM D790
Tensile Elongation: ASTM D638
Notched Izod: ASTM D256
Tensile Strength: ASTM D638

PEIE A-E

PEIE A-E are polyetherimide esters prepared from butanediol, dimethyl terephthalate, poly(propylene ether) diamine (average MW 2000) and trimellitic anhydride wherein the weight ratio of the dimethyl terephthalate to the diimide diacid prepared from the diamine and trimellitic anhydride was such as to produce polymers of flexural modulus as follows:

PEIE A 10,000 PSI
PEIE B 15,000 PSI
PEIE C 25,000 PSI
PEIE D 50,000 PSI
PEIE E 60,000 PSI

Flammability tests were performed in following with the procedure of Underwriter's Laboratory Bulletin 94 entitled "Combustion Tests for Classification of Materials, UL94". According to this procedure, the materials were classified as either UL-94 V-O, UL-94 V-I or UL-94 V-II on the basis of the test results obtained for ten samples. The criteria for each of these flammability classifications according to UL-94, are, briefly, as follows:

V-O: the average period of flaming and/or smoldering after removing the igniting flame should not exceed five seconds and none of the samples should produce drips of particles which ignite absorbent cotton.

V-I: the average period of flaming and/or smoldering after removing the igniting flame should not exceed twenty-five seconds and none of samples should produce drips of particles which ignite absorbent cotton.

V-II: the average period of flaming and/or smoldering after removing the igniting flame should not exceed twenty-five seconds and the samples produce drips of buring particles which ignite absorbent cotton.

EXAMPLES 1-19

Examples 1-19 demonstrate the various embodiments of the present invention. These examples show the applicability of the present invention to various grades of polyetherimide ester resins and various flame retardants including halogenated compounds, halogenated oligomers, and halogenated polymers. As evidenced by the results, all flame retardants had some degree of flame retardancy upon the final composition. In order to prevent dripping it is preferred to use TEFLON alone or in combination with antimony oxide. Furthermore the manisfestion of blooming or the migration of flame retardants to the surface of articles molded from the resins has been found with the use of low molecular weight halogenated flame retardants. Such a manifestation is not present with the halogenated oligomers or polymers and thus these are preferred.

However, as shown in examples 17 through 19, the use of a combination of a reactive low-molecular weight halogenated flame retardant with a polymeric high molecular weight halogenated flame retardant minimizes or prevents blooming of the low molecular weight flame retardant.

Modifications and variations of the present invention are possible in view of the above teachings. It is, therefore, to be understood that changes may be made in the particular embodiments of the invention described herein which are within the full intended scope of the invention as defined by the appended claims.

TABLE II

|  | 1 | 2 | 3 | 4 | 5 | 6 | 7 | 8 | 9 |
|---|---|---|---|---|---|---|---|---|---|
| PEIE A | — | — | — | — | — | — | — | — | — |
| PEIE B | 73.2 | 73.2 | 73.2 | 73.2 | 62.5 | 75 | — | — | 73 |
| PEIE C | — | — | — | — | — | — | 73 | — | — |
| PEIE D | — | — | — | — | — | — | — | 73 | — |
| PEIE E | — | — | — | — | — | — | — | — | — |
| PBT[a] | — | — | — | — | — | — | — | — | — |
| CLAY | — | — | — | — | — | — | — | — | — |
| TEFLON Conc. | 0.3 | 0.3 | 0.3 | 0.3 | 0.5 | 0.5 | 0.5 | 0.5 | 0.5 |

TABLE II-continued

|  |  |  |  |  |  |  |  |  |  |
|---|---|---|---|---|---|---|---|---|---|
| Sb$_2$O$_3$ Conc. | — | 6.5 | 6.5 | 6.5 | 6.5 | 6.5 | — | — | — |
| FR-1 | 22 | — | — | — | — | — | — | — | — |
| FR-2 | — | 20 | — | — | — | — | — | — | — |
| FR-3 | — | — | 20 | — | — | — | — | — | — |
| FR-4 | — | — | — | 20 | — | — | — | — | — |
| FR-5 | — | — | — | — | 30 | — | — | — | — |
| FR-6 | — | — | — | — | — | 18 | — | — | — |
| FR-7 | — | — | — | — | — | — | — | — | — |
| FR-8 | — | — | — | — | — | — | 26.5 | 26.5 | 26.5 |
| FR-9 | — | — | — | — | — | — | — | — | — |
| Notched Izod ft. lb/in | 5.0 | 4.3 | 2.8 | 2.7 | 2.1 | 4.3 | 6.8 | 3.6 | 7.2+ |
| Flexural modulus psi × 10$^3$ | 16.1 | 17.9 | 21.7 | 19.7 | 29.3 | 31.8 | 50.5 | 78.1 | 37.3 |
| Tensile Strength psi | 1960 | 1940 | 1920 | 1660 | 2050 | 1790 | 3776 | 4075 | 3180 |
| Tensile Elongation (percent) | 194 | 195 | 130 | 190 | 80 | 214 | 171 | 162 | 160 |
| UL-94 | V-2 | V-0 | V-0 | V-0 | V-0 | V-0 | V-0 | V-0 | V-0 |
| Blooming | — | — | — | — | — | — | — | — | — |

|  | 10 | 11 | 12 | 13 | 14 | 15 | 16 | 17 | 18 | 19 |
|---|---|---|---|---|---|---|---|---|---|---|
| PEIE A | — | 40 | — | — | — | — | — | — | — | — |
| PEIE B | 73 | — | 40 | 25 | — | — | — | — | — | — |
| PEIE C | — | — | — | — | — | — | — | 73.7 | 73.7 | 73.7 |
| PEIE D | — | — | — | — | 25 | 40 | — | — | — | — |
| PEIE E | — | — | — | — | — | — | 40 | — | — | — |
| PBT$^a$ | — | 40 | 40 | 40 | 40 | 40 | 40 | — | — | — |
| CLAY | — | — | — | 15 | 15 | — | — | — | — | — |
| TEFLON Conc. | 0.5 | — | — | — | — | — | — | 0.3 | 0.3 | 0.3 |
| Sb$_2$O$_3$ Conc. | — | — | — | — | — | — | — | 6.5 | 4.3 | 6.5 |
| FR-1 | — | — | — | — | — | — | — | — | — | — |
| FR-2 | — | — | — | — | — | — | — | — | — | — |
| FR-3 | — | — | — | — | — | — | — | — | — | — |
| FR-4 | — | — | — | — | — | — | — | — | — | — |
| FR-5 | — | — | — | — | — | — | — | — | — | — |
| FR-6 | — | — | — | — | — | — | — | — | — | — |
| FR-7 | 26.5 | — | — | — | — | — | — | 19.5 | 14.25 | — |
| FR-8 | — | 20 | 20 | 20 | 20 | 20 | 20 | — | — | — |
| FR-9 | — | — | — | — | — | — | — | — | 7.0 | 19.5 |
| Notched Izod ft. lb/in | 4.6 | 3.8 | 3.6 | 1.4 | 1.2 | 2.4 | 1.9 | 2.5 | 3.2 | — |
| Flexural modulus psi × 10$^3$ | 19.7 | 148 | 141 | 287 | 443 | 215 | 226 | 67.9 | 48. | — |
| Tensile Strength psi | 1934 | 4020 | 4632 | 5504 | 6592 | 6020 | 5536 | 3500 | 32. | — |
| Tensile Elongation (percent) | 129 | — | 129 | 29 | 29 | 286 | — | 60 | 100 | — |
| UL-94 | V-2 | V-2 | V-0 | V-0 | V-0 | V-0 | V-2 | V-0 | V-0 | V-0 |
| Blooming | — | — | — | — | — | — | — | NO | NO | YES |

*All compositions contained 0.5–1.2% by weight stabilizer and/or antioxidant included within the wt % PEIE component
$^a$poly(butylene terephthalate) from General Electric Company (VALOX ® 315 resin)

I claim:

1. A flame retardant thermoplastic composition comprising
   (A)(i) one or more thermoplastic elastomeric polymers chacterized as having ether, ester and imide linkages and wherein the ether linkages are present as a high molecular weight, i.e. MW of from about 400 to about 12000, polyoxyalkylene or copolyoxyalkylene units derived from long chain ether glycols or long chain ether diamines, alone or in combination with (ii) one or more modifying resins,
   (B) a flame retarding amount of a halogenated flame retarding material,
   (C) optionally, an effective amount of an organic or inorganic flame retardant synergist compound, and
   (D) optionally, an effective amount of an organic or inorganic drip suppressant material.

2. The composition of claim 1 wherein the thermoplastic elastomeric polymer A(i) is a polyetherimide ester derived from (i) one or more diols (ii) one or more dicarboxylic acids or the ester derivative thereof and (iii) one or more poly(oxyalkylene) diimide diacids or the reactants therefor.

3. The composition of claim 2 wherein the diols are selected from the group consisting of C$_2$ to C$_8$ aliphatic and cycloaliphatic diols and at least 80 mole percent of the diols are the same.

4. The composition of claim 2 wherein the diol is 1,4 butanediol.

5. The composition of claim 2 wherein at least 80 mole percent of the dicarboxylic acids are the same and are selected from the group consisting of C$_4$ to C$_{16}$ aliphatic, cycloaliphatic or aromatic dicarboxylic acids and the ester derivatives thereof.

6. The composition of claim 5 wherein the predominant dicarboxylic acid is a C$_8$ to C$_{16}$ aromatic dicarboxylic acid or the ester derivative thereof.

7. The composition of claim 2 wherein the dicarboxylic acid is dimethyl terephthalate.

8. The composition of claim 2 wherein the polyetherimide ester is prepared from a preformed poly(oxyalkylene) diimide diacid characterized as having the following formula:

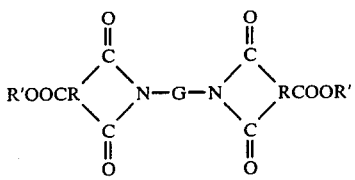

or the reactants therefor comprising monomers of the following formulas:

and

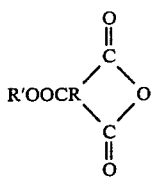

wherein each R is independently a $C_2$ to $C_{20}$ aliphatic, cycloaliphatic or aromatic trivalent organic radical; each R' is independently hydrogen or a $C_1$ to $C_6$ monovalent organic radical, and G is the radical remaining after removal of the terminal amino groups of a long chain ether diamine having a molecular weight of from about 400 to about 12,000.

9. The composition of claim 8 wherein R is a $C_6$ to $C_{20}$ aromatic trivalent organic radical, R' is hydrogen or methyl and G is derived from a long chain ether diamine having a molecular weight of from about 900 to about 4000.

10. The composition of claim 8 wherein the long chain ether diamine is selected from the group consisting of poly(ethylene ether)diamine, poly(propylene ether)diamine, poly(tetramethylene ether) diamine and copoly(ethylene ether-propylene ether)diamine.

11. The composition of claim 8 wherein the long chain ether diamine is poly(propylene ether)diamine.

12. The composition of claim 8 wherein R is a $C_6$ aromatic trivalent radical derived from trimellitic anhydride.

13. The composition of claim 8 wherein the polyetherimide ester is derived from a preformed poly(oxyalkylene) diimide diacid which is the reaction product of trimellitic anhydride and poly(propylene ether) diamine having a molecular weight of from about 900 to about 4000.

14. The composition of claim 1 wherein the halogenated flame retardant (B) is a brominated flame retarding material.

15. The composition of claim 1 wherein the halogenated flame retardant material (B) is selected from the group consisting of halogenated
   (a) aromatic and diaromatic compounds
   (b) diphenyl ethers
   (c) phthalimides and bisphthalimides
   (d) polystyrenes
   (e) polycarbonates or copolycarbonate
   (f) polyacrylates and poly(aryl acrylates)
   (g) polyphenylene oxides and
   (h) poly(bisphenol-diglycidyl ether) resins.

16. The composition of claim 15 wherein the halogenated flame retardant material (B) is poly(tetrabromobisphenol A diglycidyl ether) having about 50% aromatically bound bromine content.

17. The composition of claim 1 wherein the halogenated flame retardant is present in an amount of from about 0.5 to about 50 parts by weight per 100 parts thermoplastic material (A).

18. The composition of claim 1 wherein the halogenated flame retardant is present in an amount of from about 5 to about 40 parts by weight per 100 parts thermoplastic material (A).

19. The composition of claim 1 wherein the halogenated flame retardant is present in an amount of from about 15 to about 30 parts by weight per 100 parts thermoplastic material (A).

20. The composition of claim 1 wherein the flame retardant synergist, the drip suppressant or a mixture of the two are present.

21. The composition of claim 20 wherein the flame retardant synergist is an antimony compound and is present in an amount of from about 1 to about 15 parts by weight per 100 parts by weight thermoplastic material (A) and the drip suppressant is selected from the group of polytetrafluoroethylene and fumed silica and is present in an amount of from about 0.01 to about 5 parts by weight per 100 parts by weight thermoplastic material (A).

22. The composition of claim 21 wherein the flame retardant synergist is selected from the group consisting of antimony oxide, antimony trioxide and sodium antimonate and the drip suppressant is polytetrafluoroethylene.

23. The composition of claim 22 wherein the flame retardant synergist is antimony oxide.

24. The composition of claim 1 containing a modifier resin selected from the group consisting of condensation polymers, addition polymers and mixtures of the two in an amount of up to about 70% by weight based on the total weight of thermoplastic elastomer A(i) and modifier resin A(ii).

25. The composition of claim 24 wherein the modifier resin is present in an amount of from about 5 to about 50% by weight based on the total weight of thermoplastic elastomer A(i) and modifier resin A(ii).

26. The composition of claim 24 wherein the modifier resin A(ii) is a condensation polymer represented by the formula

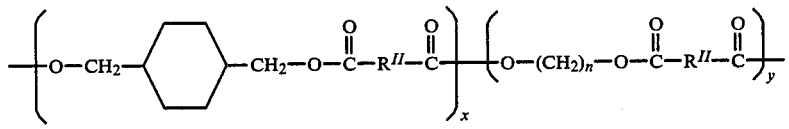

wherein $R^{II}$ is the divalent radical remaining after the removal of the carboxyl groups of an aromatic dicarboxylic acid, n is a whole number of from 2–8 and each of x and y represent 0 to 100 weight percent of the polyester provided the total of (x+y) equals 100.

27. The composition of claim 26 wherein the polyester is poly(butylene terephthalate).

28. The composition of claim 24 wherein the addition polymer is a butadiene based or n-butylacrylate based rubbery core, core-shell copolymer.

29. The composition of claim 1 containing as modifier resin a combination of poly(butylene terephthalate) and a butadiene based rubbery core core-shell copolymer and as an additional ingredient clay filler.

* * * * *